UNITED STATES PATENT OFFICE.

JOHN R. YOUNG, JR., OF NORFOLK COUNTY, VIRGINIA.

FERTILIZER.

SPECIFICATION forming part of Letters Patent No. 278,383, dated May 29, 1883.

Application filed August 30, 1882. (No specimens.)

*To all whom it may concern:*

Be it known that I, JOHN R. YOUNG, Jr., a citizen of the United States, residing in the county of Norfolk and State of Virginia, have invented a new and useful Improvement in Fertilizers, of which the following is a specification.

The primary object of my invention is to render night-soil free of its offensive odor and other objectionable features by the use of only such articles as add to its value while retaining all its own valuable fertilizing properties.

In carrying out my invention I take the materials named in about the following proportions, to wit: one thousand pounds night-soil, three hundred pounds bone phosphate of lime, two hundred pounds sulphuric acid. These materials are placed in a tank or other suitable vessel and agitated till thoroughly mixed. When the resulting chemical action is complete the compound is evaporated to dryness by exposure to the atmosphere on drying-beds, or otherwise, without the use of injurious heat, and then pulverized. Raw, calcined, or carbonized bone, dry fish-scrap, tankage, or other material containing or composed largely of bone phosphate of lime may be used, the proportions being varied according to strength of material used and amount of phosphoric acid desired. Phosphate of lime contains about fifty-four per cent. lime and forty-six per cent. phosphoric acid. Treated with sulphuric acid, the lime unites with said acid, forming sulphate of lime, leaving the phosphoric acid available.

The chemical action and changes resulting from the compounding with night-soil of bone phosphate of lime and sulphuric acid in about the proportions named may be thus explained:

First. The ammonia of the night-soil is converted into a sulphate, thereby fixing it and preventing loss by volatilization.

Second. The phosphate of lime being acted on by the sulphuric acid, superphosphate and sulphate of lime are formed, thereby rendering the phosphoric acid soluble and available as plant-food. The sulphate of lime aids effectually in reducing the moisture of and setting the compound.

Third. The heat generated by the resulting chemical action in presence of organic matter causes a deoxidation of a portion of the sulphuric acid, liberating sulphurous-acid gas or sulphur dioxide, which acts as a powerful deodorizer and disinfectant.

The use of the strongest (66 Baumé) sulphuric acid is desirable in causing the liberation of the sulphur dioxide.

The compound resulting from the combination and chemical action described is an ammoniated superphosphate containing the combined valuable properties of night-soil and bone phosphate of lime in the most available condition for plant-food. After the compound is thoroughly decomposed, evaporated to dryness, and pulverized it is ready for bagging.

My invention possesses the important advantage of depriving night-soil of its offensive ordor with other objectionable properties, and rendering it fine and dry, so that it can be sown by machinery or from the hand without offense to the person, these results being accomplished by the addition of only such articles as add to its value as a fertilizer, while it retains all its own valuable qualities.

I am aware that sulphate of lime, animal and vegetable charcoal, and other mere absorbants have been used as driers in compounding with night-soil; but I lay no claim to any such mechanical action or compound.

Having thus described my invention, the following is what I claim as new therein and desire to secure by Letters Patent:

1. The mode of producing a fertilizing compound herein described, which consists in placing night-soil, bone phosphate of lime, and sulphuric acid in a suitable receptacle and agitating these materials until thoroughly mixed, and after the chemical action is complete, evaporating the compound to dryness by suitable means, as set forth.

2. A fertilizing composition consisting of night-soil, bone phosphate of lime, and sulphuric acid, as set forth.

J. R. YOUNG, JR.

Witnesses:
E. FINLEY CROMWELL,
R. L. UPSHUR.